United States Patent
Zhang et al.

(10) Patent No.: US 10,131,855 B2
(45) Date of Patent: Nov. 20, 2018

(54) METHOD AND DEVICE FOR PYROLYSIS OF BIOMASS TO PRODUCE SYNGAS

(71) Applicant: Wuhan Kaidi Engineering Technology Research Institute Co., Ltd., Wuhan (CN)

(72) Inventors: Yanfeng Zhang, Wuhan (CN); Liang Zhang, Wuhan (CN); Yilong Chen, Wuhan (CN)

(73) Assignee: WUHAN KAIDI ENGINEERING TECHNOLOGY RESEARCH INSTITUTE CO., LTD., Wuhan (CN)

( * ) Notice: Subject to any disclaimer, the term of this patent is extended or adjusted under 35 U.S.C. 154(b) by 256 days.

(21) Appl. No.: 15/167,997

(22) Filed: May 28, 2016

(65) Prior Publication Data

US 2016/0272902 A1     Sep. 22, 2016

Related U.S. Application Data

(63) Continuation-in-part of application No. PCT/CN2014/090887, filed on Nov. 12, 2014.

(30) Foreign Application Priority Data

Nov. 29, 2013   (CN) .......................... 2013 1 0628406

(51) Int. Cl.
   *C10J 3/46*      (2006.01)
   *C10J 3/84*      (2006.01)
   (Continued)

(52) U.S. Cl.
   CPC ............... *C10J 3/466* (2013.01); *C10B 19/00* (2013.01); *C10B 53/02* (2013.01); *C10J 3/18* (2013.01);
   (Continued)

(58) Field of Classification Search
   CPC . C10J 3/18; C10J 2300/123; C10J 2300/1238
   See application file for complete search history.

(56) References Cited

U.S. PATENT DOCUMENTS

2008/0147241 A1* 6/2008 Tsangaris ............... C03B 5/005
                                               700/273
2009/0020456 A1* 1/2009 Tsangaris ............... C10G 1/002
                                               208/133
(Continued)

*Primary Examiner* — Matthew J Merkling
(74) *Attorney, Agent, or Firm* — Matthias Scholl P.C.; Matthias Scholl

(57) ABSTRACT

A method for pressurized pyrolysis of biomass in a pressurized pyrolysis furnace, including: 1) crushing and screening biomass; collecting biomass having desired particle sizes; and delivering the biomass having desired particle sizes to a pulse-type feeding system; 2) transporting the biomass to a pyrolysis furnace via the pulse-type feeding system; synchronously initiating microwave and a plasma torch, the microwave producing a microwave field in the pyrolysis furnace, working gas of the plasma torch being ionized for the first time to produce plasma jet entering the pyrolysis furnace; and 3) allowing the syngas generated in 2) to continue moving upwards and introducing the syngas out from the top of the pyrolysis furnace; chilling the syngas; introducing the syngas to a cyclone separator to separate residues; and then cooling and purifying the syngas using a cooling device and a purifying device, respectively, to produce clean syngas.

12 Claims, 1 Drawing Sheet

(51) Int. Cl.
    *C10B 53/02*    (2006.01)
    *C10K 1/02*    (2006.01)
    *C10J 3/18*    (2006.01)
    *C10B 19/00*    (2006.01)
    *C10J 3/48*    (2006.01)

(52) U.S. Cl.
    CPC .............. *C10J 3/485* (2013.01); *C10J 3/84* (2013.01); *C10K 1/026* (2013.01); *C10J 2200/15* (2013.01); *C10J 2300/0906* (2013.01); *C10J 2300/0916* (2013.01); *C10J 2300/0959* (2013.01); *C10J 2300/0969* (2013.01); *C10J 2300/0973* (2013.01); *C10J 2300/123* (2013.01); *C10J 2300/1238* (2013.01); *Y02E 50/14* (2013.01); *Y02P 20/123* (2015.11); *Y02P 20/124* (2015.11); *Y02P 20/145* (2015.11)

(56) References Cited

U.S. PATENT DOCUMENTS

| | | | |
|---|---|---|---|
| 2012/0031232 A1* | 2/2012 | Huang | C01B 3/50 75/10.13 |
| 2014/0054504 A1* | 2/2014 | Yoon | B01J 19/088 252/373 |
| 2014/0305043 A1* | 10/2014 | Zhang | C10K 1/028 48/128 |
| 2015/0041454 A1* | 2/2015 | Foret | H05H 1/40 219/601 |

* cited by examiner

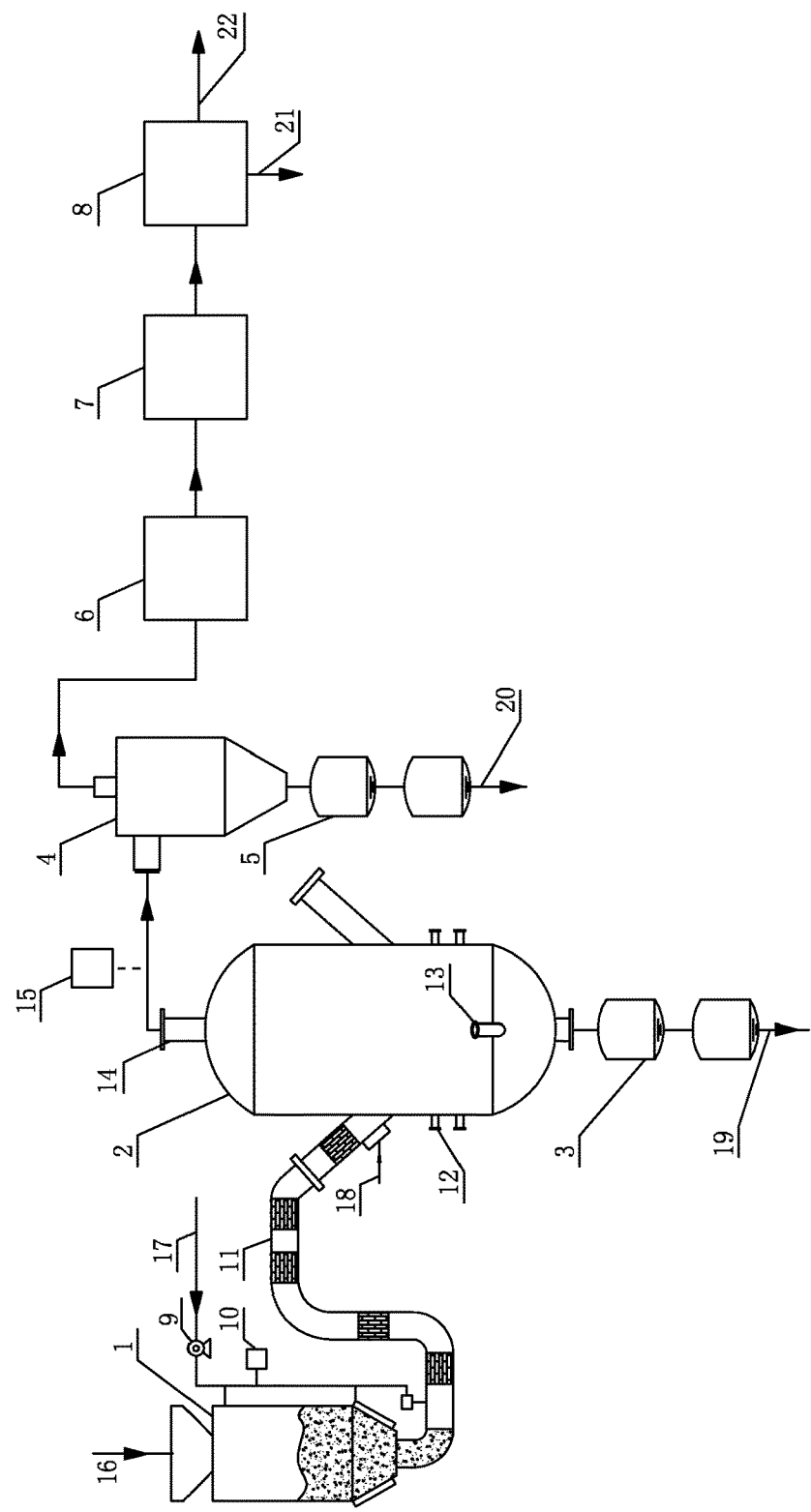

METHOD AND DEVICE FOR PYROLYSIS OF BIOMASS TO PRODUCE SYNGAS

CROSS-REFERENCE TO RELATED APPLICATIONS

This application is a continuation-in-part of International Patent Application No. PCT/CN2014/090887 with an international filing date of Nov. 12, 2014, designating the United States, now pending, and further claims priority benefits to Chinese Patent Application No. 201310628406.X filed Nov. 29, 2013. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND OF THE INVENTION

Field of the Invention

The invention relates to the gasification of the biomass, and more particularly to a method and device for pyrolysis of biomass to produce syngas using microwaves and plasma.

Description of the Related Art

Conventionally, the pyrolysis and gasification of biomass has the following disadvantages: 1. The efficiency of energy transfer from biomass to syngas is low. 2. Large amounts of byproducts, such as coke and slag, are produced. 3. Biomass conversion is incomplete. 4. The yield of syngas is low.

SUMMARY OF THE INVENTION

In view of the above-described problems, it is one objective of the invention to provide a method and device for pressurized pyrolysis of biomass. The method and the device employ coupled microwave and plasma to convert combustible compositions of the biomass into syngas, and have high economic efficiency, high carbon conversion efficiency, good syngas quality. The volume content of the effective syngas exceeds 90%. Meanwhile, the single pyrolysis furnace of the invention has high processing capacity, no compressor is involved, so that a lot of compression work and energy consumption are saved. In addition, the produced syngas contains no coke tar, so the subsequent purifying process is simple and causes no environmental pollution.

To achieve the above objective, in accordance with one embodiment of the invention, there is provided a method for pressurized pyrolysis of biomass in a pressurized pyrolysis furnace, the method comprising:

1. crushing and screening biomass, collecting biomass having desired particle sizes, and delivering the biomass having desired particle sizes to a pulse-type feeding system;

2. transporting the biomass to a pyrolysis furnace via the pulse-type feeding system in a dense-phase static pressure mode in the presence of seal air, synchronously initiating microwave and plasma torch, the microwave producing a microwave field in the pyrolysis furnace, working gas of the plasma torch being ionized for the first time to produce plasma jet entering the pyrolysis furnace; biomass particles absorbing microwave and being heated from outside to inside synchronously, and then being activated; under the action of rising syngas and high-intensity microwave energy, the biomass particles being dried instantaneously and pyrolyzed to yield syngas, small amount of ash residue and coke, the ash residue and the coke constituting a fixed bed layer moving down;

under the electromagnetic coupling of the microwave field, the plasma jet constantly ionizing gas around charged ions to form a secondary ionic field having high energy and high activity, thus accelerating the heat and mass transfer efficiency of the biomass particles; at the bottom of the fixed bed layer, the high temperature plasma jet completely converting the coke or other carbonaceous materials into high temperature syngas; the pyrolysis furnace always working under pressures, so that the concentration of gas-phase materials in the pyrolysis furnace is increased, the reaction speed is accelerated, the gas-solid contact time is prolonged, all of which are favorable to the biomass particles at the bottom of the pyrolysis furnace to be converted into high temperature syngas;

with the fixed bed layer moving down, rising high temperature syngas further heating the fixed bed layer and providing carbon dioxide as raw material gas for pyrolysis, and ash residue free of carbon continuing moving down; under high temperatures, the ash residue containing free of carbon being in a liquid state and accumulating at the bottom of the pyrolysis furnace, discharging accumulated liquid ash residue regularly or continuously to maintain a preset slag level so as to ensure the pyrolysis furnace works under pressures; and 3. allowing the high-temperature syngas generated in 2) to continue moving upwards and introducing the syngas out from the top of the pyrolysis furnace, chilling the syngas using circulating syngas in a pipe, introducing the syngas to a cyclone separator to separate residues, and then cooling and purifying the syngas using a cooling device and a purifying device, respectively, to produce clean syngas.

In a class of this embodiment, a temperature of the syngas at an outlet of the pyrolysis furnace ranges from 1100° C. to 1300° C. The temperature of the pyrolysis reaction exceeds 1200° C. The temperature of the slag pool at the bottom maintains at between 1300° C. and 2000° C. When the biomass has high ash fusion point, limestone is added as a fluxing agent to lower the fusion point temperature of the slag.

The microwave inlets of the pyrolysis furnace are arranged annularly and in a multi-layer way according to the characteristics of fuel and the power of a single microwave inlet is below 300 kw. The high-temperature syngas stays in the furnace for 8 to 15 seconds, and the absolute pressure in the furnace ranges from 0.1 megapascal to 5 megapascal.

In a class of this embodiment, in 3), the total input energy of microwave and plasma torch per unit time accounts for 15% to 30% of the total input energy of the biomass. When the working gas of the plasma torch is oxygen, the mass of the coke accounts for less than 10% of the mass of the biomass. The total power energy consumed by the microwave and plasma torch accounts for between 5% and 10% of the total energy of the biomass.

In a class of this embodiment, in 3), according to different subsequent utilization techniques, the syngas from the cyclone separator is cooled gradually and washed with water, or is chilled with water.

In a class of this embodiment, in 2), the liquid slag accumulated at the bottom of the pyrolysis furnace is discharged regularly or continuously to maintain the slag level. After passing through a slag lock equipped with a water cooling or water chilling device, the liquid slag is recycled at room temperature.

The working gas of the plasma torch is carbon dioxide and/or water vapor and/or oxygen and/or purified syngas. The plasma jet formed by the first ionization of the working gas comprises high-energy active particles comprising ions, electrons and free radicals.

In a class of this embodiment, the pulse-type feeding system is loaded using a conveying gas. The conveying gas is nitrogen, vapor, carbon dioxide or purified syngas.

In accordance with another embodiment of the invention, there is provided a device for pressurized pyrolysis of biomass, comprising a pyrolysis furnace, a pulse-type feeding system, and a cyclone separator. The pyrolysis furnace comprises a syngas outlet at a top thereof, two feeding ports arranged on both sides of a middle part thereof, a plurality of microwave inlets and interfaces of plasma torch at a lower part thereof, and a slag outlet at a bottom thereof. The microwave inlets of the pyrolysis furnace are arranged annularly and equidistantly.

The microwave inlets of the pyrolysis furnace are arranged in a multi-layer way and the power of a single microwave inlet is below 300 kw. The interfaces of the plasma torch are located below the microwave inlets, and are arranged annularly and equidistantly.

The pulse-type feeding system is connected to feeding ports of the pyrolysis furnace via a feeding pipe. The pulse-type feeding system is connected to a conveying gas pipe and a feeding controller is provided to control the opening and closing of the conveying gas pipe. The syngas outlet at the top of the pyrolysis furnace is connected to the cyclone separator. The slag outlet at the bottom of the pyrolysis furnace is connected to the slag lock. An ash outlet of the cyclone separator is connected to the ash lock. The cyclone separator is connected to a cooling device. The cooling device is connected to a purifying device. A circulating chilling device is arranged between the syngas outlet at the top of the pyrolysis furnace and the cyclone separator.

In a class of this embodiment, at least two slag locks are arranged in series outside the slag outlet at the bottom of the pyrolysis furnace. At least two ash locks are arranged in series outside the ash outlet at the bottom of the cyclone separator.

In a class of this embodiment, a decarburization tower is arranged following the purifying device, and the decarburization tower comprises a carbon dioxide outlet which is connected to the conveying gas pipe of the pulse-type feeding system.

The beneficial effects of the method and device for pressurized pyrolysis of biomass are as follows:

The device and method for pressurized pyrolysis of biomass is capable of converting all combustible compositions of the biomass into high-quality syngas and the volume content of the effective gas is high. In contrast, although the conventional biomass pyrolysis technique can also produce high-quality syngas, a large amount of coke residue is produced and the weight of the coke residue accounts for 20% to 30% of the weight of the biomass. The mixture of the coke residue and slag causes a lot of loss of sensible heat and, compared to the biomass, the coke residue produced by pyrolysis has less reaction activity, is not conducive to gasification, which causes the loss of carbonic materials.

In contrast, in the invention, a high-intensity microwave field is always maintained inside the pyrolysis furnace so that the content of the coke substance is less than 10%.

All in all, the microwave and plasma are coupled to form a secondary high-energy high-activity ionic field at the bottom of the pyrolysis furnace, and the slag accumulates at the bottom of the pyrolysis furnace to form a slag pool. Studies show that high content of alkali metal substances in the slag favors the catalytic reaction of the biomass, thus speeding up the chemical reaction of gas-solid-liquid mass transfer, shortening the reaction time, so that the biomass can be completely converted into syngas.

Advantages of the method and device for pressurized pyrolysis of biomass are summarized as follows:

1. The microwave and the plasma are coupled for pyrolysis of the biomass. The heating process has no thermal inertia. The pyrolysis is performed in the high-temperature ionic state. The pyrolysis is complete and the combustible compositions are converted into syngas completely. The carbon conversion efficiency is high. The quality of the syngas is good. The volume content of the effective gas exceeds 90%.

2. The biomass is fed to the pyrolysis furnace under pressures. The single furnace has strong processing capacity. No compressor is required in the subsequent utilization process so a lot of compression work and energy consumption are saved.

3. The syngas contains no tar. The subsequent purifying technique is simple and causes no pollution.

4. The biomass is fed in a dense-phase static pressure mode. The biomass does not need to be crushed excessively. The device and the method are economical.

BRIEF DESCRIPTION OF THE DRAWINGS

The invention is described hereinbelow with reference to accompanying drawings, in which the sole FIGURE is a structural diagram of a device for pressurized pyrolysis of biomass according to one embodiment of the invention.

In the drawings, the following number references are used: 1. Pulse-type feeding system; 2. Pyrolysis furnace; 3. Slag lock; 4. Cyclone separator; 5. Ash lock; 6. Cooling device; 7. Purifying device; 8. Decarburization tower; 9. Compressor; 10. Feeding controller; 11. Feeding pipe; 12. Microwave inlet; 13. Plasma torch; 14. Syngas outlet; 15. Controller of pyrolysis furnace; 16. Biomass; 17. Conveying gas; 18. Seal air; 19. Slag; 20. Fly ash; 21. Carbon dioxide; 22. Syngas.

DETAILED DESCRIPTION OF THE EMBODIMENTS

For further illustrating the invention, experiments detailing a device and method for pressurized pyrolysis of biomass with rice hulls as an example are described below. It should be noted that the following examples are intended to describe and not to limit the invention.

A device for pressurized pyrolysis of biomass as shown in the sole figure comprises a pyrolysis furnace 2, a pulse-type feeding system 1 and a cyclone separator 4. The pyrolysis furnace 2 is a cylinder in shape; the outer wall of the pyrolysis furnace is made of steel; and the inner wall of the pyrolysis furnace is built by refractory bricks or has a water wall. The high-temperature syngas outlet 14 is arranged at the top of the pyrolysis furnace 2; the feeding ports are arranged on both sides of the middle part of the pyrolysis furnace; a plurality of microwave inlets 12 and interfaces of plasma torch 13 are arranged in the lower part of the pyrolysis furnace; and the slag outlet is arranged at the bottom of the pyrolysis furnace. The microwave inlets 12 of the pyrolysis furnace are arranged annularly at an even interval.

The microwave inlets 12 of the pyrolysis furnace are arranged in a multi-layer way and the power of a single microwave inlet is below 300 kw. The interfaces of the plasma torch 13 are arranged below the microwave inlets 12 and disposed annularly at an even interval.

The pulse-type feeding system 1 is connected to the feeding ports of the pyrolysis furnace via the feeding pipe 11. The pulse-type feeding system 1 is connected to a conveying gas pipe and a feeding controller is provided to control the opening and the closing of the conveying gas pipe. The syngas outlet at the top of the pyrolysis furnace is connected to the cyclone separator. The slag outlet at the bottom of the pyrolysis furnace is connected to the slag lock 3. The cyclone separator 4 is connected to the ash lock 5. The cyclone separator 4 is connected to the cooling device 6. The cooling device 6 is connected to the purifying device 7. A circulating chilling device is arranged between the syngas outlet 14 at the top of the pyrolysis furnace and the cyclone separator 4.

According to the technical proposal, at least two slag locks 3 are arranged outside the slag outlet at the bottom of the pyrolysis furnace 2 in series. At least two ash locks 4 are arranged outside the ash outlet at the bottom of the cyclone separator in series.

According to the technical proposal, a decarburization tower 8 is arranged following the purifying device 7. The carbon dioxide outlet of the decarburization tower is connected to the feeding pipe of the pulse-type feeding system 1.

As shown in the FIGURE, a method for pressurized pyrolysis of biomass is summarized as follows:

1) Rice hulls are crushed and screened to have a size of less than 3 mm, and then the rice hulls (biomass 16) are added to the pulse-type feeding system. The pulse-type feeding system 1 uses a compressor 9 to pressurize the conveying gas 17. The pressurized conveying gas is transported to the air distributors at the top and bottom of the feed bin and the pulse-type pneumatic knife valve of the pyrolysis furnace. The feeding controller 10 controls the opening and closing of each pipe valve to transport the rice hulls in the feeding pipe 11 in a static pressure mode. Part of the pressurized conveying gas 17 is introduced to the vicinity of the feeding cock and the inlet of the gasification furnace to function as the seal air 18 to assist feeding. The seal air can cool the feeding ports of the pyrolysis furnace to avoid coking of biomass particles at the feeding ports, and the kinetic energy of the seal air close to the feeding ports can transport biomass and prevent the jamming and bridging of materials.

2) The rice hulls are transported to the pyrolysis furnace 2. Under the action of rising high-temperature gas and high-intensity microwave energy in the furnace, the rice hulls are dried and cleaved instantly, and the temperature of the rice hulls rise rapidly. The heating process has no thermal inertia. The heating method is different from conventional heating methods where heat energy is transferred from the outer wall to the interior of the particles. Therefore, the heating method has a good activation on biomass particles and improves the pyrolysis reaction rate so that the biomass can be converted into syngas to the utmost within a short time after entering the pyrolysis furnace. The syngas mainly contains CO, $CH_4$ and $H_2$. The syngas also contains a small amount of $CO_2$ and $H_2O$. The technique does not need any oxidant or gasification agent, and the syngas is totally produced by the pyrolysis of the biomass.

3) After the pyrolysis of the rice hulls, the ash residue and a small amount of coke form a fixed bed layer (the bed layer is totally formed by the coke produced by the pyrolysis of the biomass, has very lower reaction activity and is not easy to burn out). The fixed bed layer moves downwards. The plasma torch 13 at the bottom of the fixed bed layer produces high-temperature plasma flow to gasify the coke at high-temperatures. Under the action of the electromagnetic coupling of the high-intensity microwave field, the high-temperature plasma flow features a higher charged ion activity and stronger reactivity and can completely convert the carbonic substances into high-temperature syngas. The syngas moves upwards to provide heat energy for the fixed bed layer and, at the same time, provides the material gas $CO_2$ for the pyrolysis reaction at the upper part of the pyrolysis furnace. The non-carbonic substance continues moving downwards and becomes slag. In the high-temperature environment, the slag is liquid and accumulates at the bottom to form a slag pool. The liquid slag is discharged regularly or continuously so as to maintain the slag level. After passing through the water cooling or water chilling slag lock 3, the liquid slag is recycled at room temperature.

4) The high-temperature syngas is introduced out from the syngas outlet 14 of the pyrolysis furnace 2, and enters the high-temperature cyclone separator 4. The temperature of the ash residue in the syngas is lowered to below the fusion point of the ash residue by adopting the circulating chilling method in the pipe of the cyclone separator 4. The fly ash 20 separated by the cyclone separator enters the ash lock 5, and then the separated syngas enters the cooling device 6. A chilling tower or waste heat boiler is used to cool the syngas.

5) The cooled syngas enters the purifying device 7 where hazardous gaseous impurities are removed. Meanwhile, the purifying device 7 also comprises a conversion tower for the conversion reaction (For example, if you want to convert CO into hydrogen, it only needs to add water to the conversion tower), in particular for the conversion process of the syngas rich in saturated vapor produced by the chilling technique.

6) Preferably, the decarburization tower 8 is arranged following the purifying device 7 for removal of carbon dioxide 21 from the syngas. The improved syngas 22 features higher heat value and better quality. The carbon dioxide 21 can be used as the conveying gas 17.

In 1), it's not necessary to crush the biomass excessively. The particle size is less than 10 mm and preferably, the particle size is less than 3 mm. The biomass should be as dry as possible. The high water content of the biomass influences the quality of the syngas and the energy consumption of the system. Preferably, the waste heat can be used to dry the fuel.

In 1), the conveying gas 17 is carbon dioxide, nitrogen gas or vapor. The carbon dioxide produced in the decarburization tower 8 can be recycled and the high-temperature syngas can also be used.

In 2), the microwave inlets 12 of the pyrolysis furnace 2 are arranged annularly and can be arranged in a multi-layer way according to characteristics of fuel and the power of a single microwave is below 300 kw. The high-temperature syngas stays in the high-temperature area for 8 to 15 seconds. The absolute pressure in the furnace can be determined economically according to the subsequent utilization technique. The preferred absolute pressure ranges from 0.1 megapascal to 5 megapascal.

In 3), the plasma torch 13 mainly provides a high-temperature heat source, which can maintain a certain level of liquid slag at the bottom of the pyrolysis. The heat storage capacity of the liquid slag pool plays a role in maintaining the stability of the working condition in the furnace. The working gas is purified syngas 22 and/or carbon dioxide 21 and/or water vapor and/or oxygen.

In 3), the total input energy of the microwave and plasma torch per unit time accounts for 15% to 30% of the total input energy of the biomass. The electrical energy is generated by solar power generation, waste heat or low-price electrical energy, so as to lower the cost of energy and improve the economy of the technique. Particularly, when the plasma working gas is oxygen, a violent combustible and exothermic reaction happens between oxygen and the coke to provide heat energy for the whole pyrolysis reaction. The mass of the coke accounts for less than 10% of the mass of the biomass. As a result, the total power energy consumed by the microwave and plasma torch accounts for between 5% and 10% of the total energy of the biomass.

In 3), the temperature of the pyrolysis reaction exceeds 1100° C. The temperature of the high-temperature slag pool at the bottom maintains between 1300° C. and 2000° C. and the preferred temperature is between 1400° C. and 1600° C. Fluxing agents like limestone can be added to the fuel having a high ash fusion point to lower the fusion temperature of the slag.

In 3), due to the complicated working conditions of pyrolysis, the conventional manual operation method cannot meet the operation requirements for the coupled pyrolysis technique. Therefore, parameters such as the temperature of syngas, the microwave power, the plasma power and the slag level can be controlled by a controller 15 of the pyrolysis furnace.

In 4), a preferable temperature of the chilling area from the top of the pyrolysis furnace to the high-temperature cyclone separator 4 ranges from 600° C. to 850° C.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for pressurized pyrolysis of biomass in a pressurized pyrolysis furnace, the method comprising:
   1) crushing and screening biomass; collecting biomass having desired particle sizes; and delivering the biomass having desired particle sizes to a pulse-type feeding system;
   2) transporting the biomass to a pyrolysis furnace via the pulse-type feeding system in a dense-phase static pressure mode in the presence of seal air; synchronously initiating microwave and a plasma torch, the microwave producing a microwave field in the pyrolysis furnace, working gas of the plasma torch being initially ionized to produce plasma jet entering the pyrolysis furnace;
   in the pyrolysis furnace, biomass particles absorbing microwave and being heated from outside to inside instantaneously, and then being activated; under the action of rising syngas and microwave energy, the biomass particles being dried instantaneously and pyrolyzed to yield syngas, small amount of ash residue and coke, the ash residue and the coke constituting a fixed bed layer moving down;
   under the electromagnetic coupling of the microwave field, the plasma jet constantly ionizing gas around charged ions to form a secondary ionic field, thus accelerating the heat and mass transfer efficiency of the biomass particles; at the bottom of the fixed bed layer, the plasma jet completely converting the coke or other carbonaceous materials into syngas;
   with the fixed bed layer moving down, rising syngas heating the fixed bed layer and providing carbon dioxide as raw material gas for pyrolysis, and ash residue free of carbon continuing moving down; the ash residue containing free of carbon being in a liquid state and accumulating at the bottom of the pyrolysis furnace, discharging accumulated liquid ash residue regularly or continuously to maintain a preset slag level; and
   3) allowing the syngas generated in 2) to continue moving upwards and introducing the syngas out from the top of the pyrolysis furnace; chilling the syngas using circulating syngas in a pipe; introducing the syngas to a cyclone separator to separate residues; and then cooling and purifying the syngas using a cooling device and a purifying device, respectively, to produce clean syngas.

2. The method of claim 1, wherein
   a temperature of the syngas at an outlet of the pyrolysis furnace ranges from 1100° C. to 1300° C.; a pyrolysis temperature in the pyrolysis furnace exceeds 1200° C.; a temperature of a slag pool at the bottom of the pyrolysis furnace is maintained at between 1300° C. and 2000° C.;
   limestone is added as a fluxing agent to lower a fusion point temperature of slag;
   the pyrolysis furnace comprises microwave inlets which are arranged annularly and equidistantly in a multi-layer way; and
   a power of a single microwave inlet is below 300 kw; the syngas stays in the pyrolysis furnace for 8 to 15 seconds, and an absolute pressure in the pyrolysis furnace ranges from 0.1 megapascal to 5 megapascal.

3. The method of claim 1, wherein in 3), a total input energy of the microwave and the plasma torch per unit time accounts for 15% to 30% of a total input energy of the biomass; when the working gas of the plasma torch is oxygen, a mass of the coke accounts for less than 10% of that of the biomass, and a total power energy consumed by the microwave and the plasma torch accounts for between 5% and 10% of a total energy of the biomass.

4. The method of claim 2, wherein in 3), a total input energy of the microwave and the plasma torch per unit time accounts for 15% to 30% of a total input energy of the biomass; when the working gas of the plasma torch is oxygen, a mass of the coke accounts for less than 10% of that of the biomass, and a total power energy consumed by the microwave and the plasma torch accounts for between 5% and 10% of a total energy of the biomass.

5. The method of claim 3, wherein in 3), the syngas from the cyclone separator is cooled gradually and washed with water, or is chilled with water.

6. The method of claim 4, wherein in 3), the syngas from the cyclone separator is cooled gradually and washed with water, or is chilled with water.

7. The method of claim 3, wherein in 2), the liquid slag accumulated at the bottom of the pyrolysis furnace is discharged regularly or continuously to maintain the slag level; after passing through a slag lock equipped with a water cooling or water chilling device, the liquid slag is recycled at room temperature.

8. The method of claim 4, wherein in 2), the liquid slag accumulated at the bottom of the pyrolysis furnace is discharged regularly or continuously to maintain the slag level; after passing through a slag lock equipped with a water cooling or water chilling device, the liquid slag is recycled at room temperature.

9. The method of claim 3, wherein the working gas of the plasma torch is carbon dioxide and/or water vapor and/or oxygen and/or purified syngas; the plasma jet formed by the first ionization of the working gas comprises active particles comprising ions, electrons and free radicals.

10. The method of claim 4, wherein the working gas of the plasma torch is carbon dioxide and/or water vapor and/or oxygen and/or purified syngas; the plasma jet formed by the first ionization of the working gas comprises active particles comprising ions, electrons and free radicals.

11. The method of claim 3, wherein the pulse-type feeding system is loaded using a conveying gas which is nitrogen, vapor, carbon dioxide or purified syngas.

12. The method of claim 4, wherein the pulse-type feeding system is loaded using a conveying gas which is nitrogen, vapor, carbon dioxide or purified syngas.

* * * * *